United States Patent
Lysson et al.

[11] Patent Number: 6,044,665
[45] Date of Patent: Apr. 4, 2000

[54] METHOD FOR COATING AN OPTICAL FIBER

[75] Inventors: Hans-Jürgen Lysson, Korschenbroich, Germany; Anne Dieumegard, Houplin Ancoisne; Arnaud Mairesse, Lille, both of France

[73] Assignee: Alcatel, Paris, France

[21] Appl. No.: 09/143,919

[22] Filed: Aug. 31, 1998

[30] Foreign Application Priority Data

Sep. 4, 1997 [DE] Germany .............. 197 38 687

[51] Int. Cl.⁷ .................. C03C 25/02
[52] U.S. Cl. ................ 65/430; 65/382; 65/384; 65/443; 65/450; 427/163.2; 427/10; 427/558; 427/434.2
[58] Field of Search .............. 65/377, 384, 385, 65/382, 430, 431, 432, 443, 447, 450; 427/10, 163.1, 163.2, 434.2, 434.6, 434.7, 558

[56] References Cited

U.S. PATENT DOCUMENTS

| | | | |
|---|---|---|---|
| 4,073,974 | 2/1978 | Albarino et al. | 427/434.7 |
| 5,024,507 | 6/1991 | Minns et al. | 427/163.2 |
| 5,054,883 | 10/1991 | Eckberg . | |
| 5,268,984 | 12/1993 | Hosoya et al. . | |
| 5,366,527 | 11/1994 | Amos et al. . | |
| 5,885,652 | 3/1999 | Abbott, III et al. | 427/434.7 |

FOREIGN PATENT DOCUMENTS

| | | |
|---|---|---|
| 0 509 487 A2 | 4/1992 | European Pat. Off. . |
| 0 619 275 A2 | 3/1994 | European Pat. Off. . |
| 0 842 909 A1 | 11/1997 | European Pat. Off. . |
| 2-212338 | 8/1990 | Japan . |
| 8-082725 | 3/1996 | Japan . |

OTHER PUBLICATIONS

Kimura et al., "Coating Technique for High Speed drawing", Sixth European Conference on Optical Communication, York, England, Sep. 1980.

U.C. Paek: "High–Speed High–Strength Fiber Drawing", Journal of Lightwave Technology, Aug. 1986, pp. 1048–1060.

*Primary Examiner*—Peter Chin
*Assistant Examiner*—Michael P. Colaianni
*Attorney, Agent, or Firm*—Ware, Fressola, Van der Sluys & Adolhson LLP

[57] ABSTRACT

A method for coating an optical fiber (1) has the optical fiber (1) exiting the longitudinal direction through a coating nozzle (10) from a volume (11) which is filled with a liquid hardenable coating material (6). The surface of the fiber is spaced from the wall (12) of the coating nozzle (10). The viscosity of the coating material (6) at room temperature is greater than 2500 mPa·s and the temperature of the coating material (6) is adjusted high enough for the coating material (6) to have a viscosity of less than 2000 mPa·s.

15 Claims, 1 Drawing Sheet

METHOD FOR COATING AN OPTICAL FIBER

BACKGROUND OF THE INVENTION

1. Technical Field

The invention relates to a method for coating an optical fiber.

2. Description of the Prior Art

Optical fibers, in particular glass fibers, are conventionally provided with a surface coating to protect the fibers from mechanical damage and contamination, to improve handling and, if necessary, to differentiate the fibers by color. In a method described in EP 509 487 A2, the fiber is initially drawn from a preform in a furnace in a manner known in the art. After the fiber has sufficiently cooled down, the fiber passes in the longitudinal direction through a coating unit where a liquid hardenable coating material is continuously applied to the fiber surface. The viscosity of the coating material at room temperature (25° C.) is between 2000 and 6000 mPa·s. Commercially available coating materials have a viscosity of approximately 2500 to 5000 mPa·s and are typically processed at temperatures between 25 and 45° C. for easy handling.

In a coating unit which is illustrated in EP 619 275 A2, the coating material is pressurized inside a volume into which the fiber enters through a guide nozzle. The fiber exits from the coating material through a coating nozzle, wherein the walls of the coating nozzle are spaced apart from the surface of the fiber. The fiber pulls the coating material which adheres to the fiber due to surface adhesion, from the coating unit through the coating nozzle, so that the fiber becomes coated with a liquid film. The material is hardened in a subsequent hardening unit, preferably by ultraviolet radiation. Plastic materials, in particular UV-hardenable resins with polymers containing urethane groups, are commonly used.

With the process just described, coatings having two or more layers are applied to glass fibers in mostly identical consecutive coating and hardening units. A relatively soft primary coating and a harder secondary coating for mechanical protection are preferred. To distinguish the different fibers by their color, the secondary coating may include pigments. Alternatively, an outer color coating may be applied in an additional process step. UV-hardenable materials are increasingly also used to color the fibers since inks that contain solvents are hazardous for the environmental and require a comparatively long transport path to dry if the transport speed of the fiber is high.

The quality of the applied coatings is often inadequate particularly at fiber velocities in the range above 1000 m/min. In particular, the coating material is frequently distributed asymmetrically relative to the fiber axis, i.e. the fiber is located eccentrically in the surrounding material. The same problem exists also with UV-hardenable inks, because the coating film requires a minimum thickness of at least several micrometers. Moreover, the liquid coating film frequently tears away from the surface of the fiber at velocities above about 1000 m/min, rendering the fiber useless.

SUMMARY OF THE INVENTION

With the foregoing in mind, it is the object of the invention to develop a coating method which embeds the fiber in the center of the coating material and does not require a costly conversion of the coating machine, and which reduces the possibility that the coating material tears away from the surface of the fiber.

The above mentioned object is achieved by a method for coating an optical fiber comprising the steps of:

(a) providing a volume which is filled with a liquid hardenable coating material having a viscosity at room temperature greater than 2500 mPa·s;

(b) adjusting the temperature of the coating material so that the viscosity of the coating material is smaller than 2000 mPa·s;

(c) providing a coating nozzle having a wall defining a diameter and communicating with the volume; and (d) passing the optical fiber through the volume and the coating nozzle at a transport speed to provide a coating having a thickness on the optical fiber, the optical fiber being spaced apart from the wall of the coating nozzle.

During the adjusting step, the viscosity of the coating material is in a range between 1000 and 1500 mPa·s and is preferably 1200 mPa·s. Desirably, the coating material is hardenable by ultraviolet radiation.

The coating of the optical fiber produced by the method of the invention can be a primary coating, a secondary coating or a color marking coating. For a primary coating, the temperature of the coating material in the volume is approximately equal to a maximum temperature at which the coating material is chemically stable.

In accordance with the invention, the coating material disposed in volume is pressurized. The pressure in the volume is in a range of 400 to 1000 hPa and is preferably 600 hPa. The transport speed of the optical fiber is at least equal to 1000 m/min.

The temperature of the coating material is the same as the temperature of the optical fiber as it enters the volume. A control circuit is provided for adjusting the temperature of the coating material and/or the temperature of the optical fiber wherein a control variable of the control circuit is the thickness of the coating.

The invention will be fully understood when reference is made to the following detailed description taken in conjunction with the accompanying drawing.

DETAILED DESCRIPTION OF THE INVENTION

Figure 1:
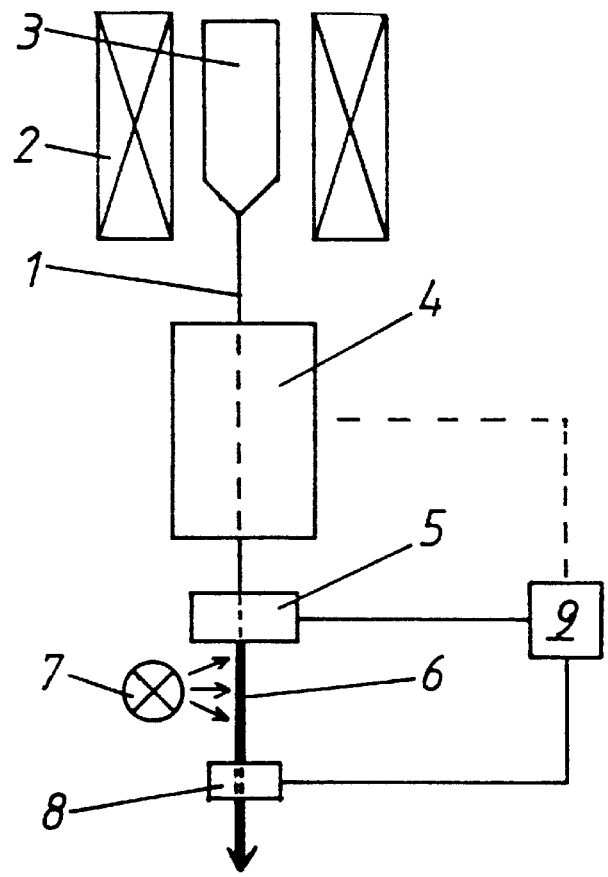
FIG. 1 is a schematic representation of an apparatus for carrying out the method of the invention.

With the method of the invention, a fiber 1 is drawn in a drawing furnace 2 from a preform 3 and subsequently passes through a cooling unit 4 and a coating unit 5 where a liquid coating material 6 is applied. An ultraviolet light source 7 is arranged subsequent to the coating unit 5 for hardening the applied coating material 6. A sensor unit 8 measures the layer thickness of the coating material 6. Depending on the measured layer thickness, a controller 9 regulates the operating parameters of the coating unit 5 and possibly also of the cooling unit 4. Typically, the fiber 1 passes after the sensor unit 8 through additional coating units of similar design where one or several secondary coatings and an ultraviolet-hardenable marking ink are applied.

Figure 2:
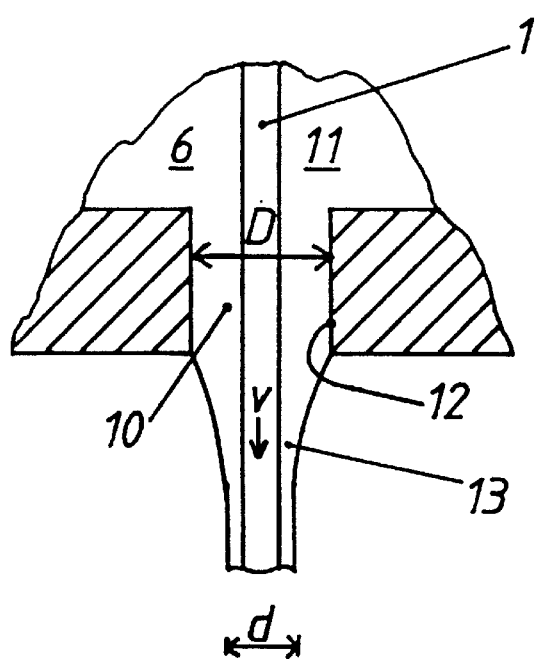
FIG. 2 is a cross-sectional view through a coating nozzle with a fiber passing therethrough.

FIG. 2 shows a sectional view through a section of the coating unit 5 with the coating nozzle 10. The fiber 1 passes through the center of the coating nozzle 10 at a transport speed v of preferably approximately 1000 m/min. The fiber 1 then exits from a volume 11 filled with the coating material 6 through the coating nozzle 10 wherein the wall 12 of the nozzle 10 is a spaced apart from the surface of the fiber 1. Consequently, a film 13 of the coating material 6 is formed on the surface of the fiber 1, with the diameter d of the film 13 depending on the diameter D of the coating nozzle and the shape of the nozzle channel.

The diameter d of the film 13 is also determined by the viscosity of the coating material 6 which in turn is a function of temperature. If the diameter D of the coating nozzle 10 is sufficiently large, a film 13 with a sufficient thickness is formed on the surface of the fiber 1, even if the viscosity of the coating material 6 is low. Due to the low viscosity of the coating material 6, the fiber 1 is advantageously centered in the applied coating, because the produced film 13 is symmetric with respect to the longitudinal axis of the fiber 1. The tendency of the film 13 to tear away from the fiber 1 is also reduced, because the lower viscosity also reduces the shear forces in the coating nozzle 10.

The basic concept of the invention is to provide the coating material 6 with a low viscosity in the liquid state. The viscosity is preferably between 1000 and 1500 mPa·s. This improves the viscous properties of the coating material 6 for forming the film 13 with uniform thickness, so that the fiber 1 is embedded in the film 13 closer to the center. Simultaneously, shear forces within the liquid coating material 6 in the region of the coating nozzle 10 are also reduced. The adhesion of the coating material 6 to the fiber surface is then sufficient to prevent the coating film 13 from tearing away even if the fiber velocity exceeds about 1000 m/min. The coating material 6 can form any coating on the fiber 1, in particular the primary coating, the secondary coating or a color marking coating.

It is also proposed to adjust the viscosity of the coating material 6 by heating the coating unit volume 11 and, more particularly, the coating nozzle 10 to a sufficiently high temperature to then be able to use commercially available coating materials. The processing temperature of the coating material 6 is preferably increased by about 10° C. above the present state of the art. The temperature for the primary coating is advantageously increased from 45° C. to 55° C., thereby reducing the viscosity from 2300 mPa·s to 1200 mPa·s, whereas the temperature at which the secondary coating is applied, is increased from 26° C. (viscosity=4700 mPa·s) to 38° C. (1200 mPa·s). The transport velocity of the fiber 1 in continuous operation is preferably at least 1000 m/min.

To achieve the same coating thicknesses in spite of the lower viscosity, the cross-section of the respective coating nozzle has to be increased over that used in conventional processes. If the diameter of the primary coating nozzle is enlarged by about 3 μm from 224 μm to 227 μm, then the outside diameter of the primary coating remains unchanged with 180–200 μm for a fiber diameter of 125 μm and thus corresponds to the commonly used standard. To obtain a secondary coating with an outside diameter of 245+/−10 μm, the diameter of the secondary coating nozzle has to be increased by about 5 micrometers from 325 μm to approximately 330 μm. Moreover, comparatively less pressure is applied to the coating material inside the coating unit as a result of its lower viscosity. The pressure is advantageously reduced by about 30 to 70% as compared to conventional processes, to 400–1000 hPa, preferably to 600 hPa. The viscosity is then 1200 mPa·s for both the primary coating and the secondary coating.

In an advantageous embodiment of the method, the coating material 6 is hardened by ultraviolet radiation from the ultraviolet light source 7. This makes it possible to use solvent-free coating materials, in particular solvent-free marking inks, thereby eliminating the environmental hazards associated with solvents. The coating material can then also be hardened along a comparatively short transport path, even if the fiber 1 moves at a high speed.

The temperature of the coating material 6 is preferably at least approximately equal to the fiber temperature so as to produce a coating of high quality.

It is proposed that the temperature of the coating material 6 is approximately equal to the maximum temperature at which the coating material 6 is chemically stable, when applying the primary coating of the fiber. However, the temperature is preferably set approximately 5° C. lower than the maximal temperature to simplify the process control. Since conventional coating materials are stable to approximately 60° C., a suitable coating temperature is in the range of 55° C. The higher process temperature advantageously reduces the cooling requirements for the fiber 1 before the coating unit 5.

The temperature of the coating material and/or of the fiber can be advantageously adjusted by the controller 9. The process control variable is the coating thickness which can be measured with the sensor 8 following the coating nozzle 10 or the hardening unit 7 in the transport direction of the fiber. The control element of the controller 9 is advantageously a heating or cooling unit adapted to control the temperature of the fiber and/or of the coating unit and/or of the coating material. A change in the temperature causes a change in the viscosity of the coating material 6 which in turn causes the coating thickness to vary. The control circuit can therefore be used to adjust the coating thickness to a predetermined value.

The embodiments described above admirably achieve the objects of the invention. However, it will be appreciated that departures can be made by those skilled in the art without departing from the spirit and scope of the invention which is limited only by the following claims.

What is claimed is:

1. Method for coating an optical fiber comprising the steps of:

(a) providing a volume which is filled with a liquid hardenable coating material having a viscosity at room temperature greater than 2500 mPa·s;

(b) adjusting the temperature of the coating material so that the viscosity of the coating material is smaller than 2000 mPa·s and the temperature of the coating material during the adjusting step is the same as the temperature of the optical fiber;

(c) providing a coating nozzle having a wall defining a diameter and communicating with the volume; and (d) passing the optical fiber through the volume and the coating nozzle at a transport speed to provide a coating having a thickness on the optical fiber, the optical fiber being spaced apart from the wall of the coating nozzle.

2. Method according to claim 1, wherein the viscosity of the coating material is in a range between 1000 and 1500 mPa·s during the adjusting step.

3. Method according to claim 2, wherein the viscosity of the coating material is 1200 mPa·s during the adjusting step.

4. Method according to claim 1, wherein the coating material is hardenable by ultraviolet radiation.

5. Method according to claim 1, wherein the coating of the optical fiber is a primary coating.

6. Method according to claim 5, wherein, during the adjusting step, the temperature of the coating material in the volume is approximately equal to a maximum temperature at which the coating material is chemically stable.

7. Method according to claim 1, wherein the coating of the optical fiber is a secondary coating.

8. Method according to claim 1, wherein the coating of the optical fiber is a color marking coating.

9. Method according to claim 1, wherein the coating material disposed in volume is pressurized to a pressure.

10. Method according to claim 9, wherein the pressure in the volume is in a range of 400 to 1000 hPa.

11. Method according to claim 10, wherein the pressure in the volume is 600 hPa.

12. Method according to claim 1, wherein the transport speed is at least equal to 1000 m/min.

13. Method according to claim 1, further including the step of providing a control circuit for adjusting the temperature of the coating material wherein a control variable of the control circuit is the thickness of the coating.

14. Method according to claim 13, wherein the control circuit also adjusts the temperature of the optical fiber.

15. Method according to claim 1, further including the step of providing a control circuit for adjusting the temperature of the optical fiber wherein a control variable of the control circuit is the thickness of the coating.

* * * * *

UNITED STATES PATENT AND TRADEMARK OFFICE
CERTIFICATE OF CORRECTION

PATENT NO.    : 6,044,665  
DATED         : April 4, 2000  
INVENTOR(S)   : Hans-Jürgen Lysson et al.

It is certified that error appears in the above-identified patent and that said Letters Patent is hereby corrected as shown below:

Title Page:
Under "Inventors", after "Anne Dieumegard", change "Houplin, Ancoisne" to --Saint Pierre d'Albigny--.
Under "Inventors", after "Arnaud Mairesse", change "Lille" to --Haisnes--.

Signed and Sealed this

Third Day of July, 2001

*Attest:*

*Attesting Officer*

NICHOLAS P. GODICI
*Acting Director of the United States Patent and Trademark Office*